United States Patent Office
3,679,562
Patented July 25, 1972

3,679,562
**LOWER TEMPERATURE SOLID PHASE POLYM-
ERIZATION OF ACRYLONITRILE IN THE PRES-
ENCE OF AN ORGANIC CARBONYL COMPOUND**
Yoneho Tabata, Chiba-ken, and Chihiro Oizumi, Tokyo,
Japan, assignors to Japan Atomic Energy Research
Institute, Tokyo, Japan
No Drawing. Filed Dec. 15, 1969, Ser. No. 885,284
Claims priority, application Japan, Dec. 23, 1968,
43/93,741
Int. Cl. B01j 1/00; C08d 1/00; C08f 1/16
U.S. Cl. 204—159.23
6 Claims

ABSTRACT OF THE DISCLOSURE

The present disclosure relates to a process of solid phase polymerization of acrylonitrile by means of an ionizing radiation below the melting point of an acrylonitrile, characterized in that an organic carbonyl compound or compounds are added to acrylonitrile before the polymerization thereof. The carbonyl compound added to the polymerization system serves to control the molecular weight of polyacrylonitrile and improve other physical properties of the polymer.

BACKGROUND OF THE INVENTION

Acrylonitrile is polymerized by means of various kinds of radical polymerization catalysts and ionic polymerization catalysts so as to produce polyacrylonitrile. It is well known that polyacrylonitrile is formed into fiber, filament or other shapes and used as an industrial material. In order to use polyacrylonitrile as a shapable material in industry, it is necessary to obtain polyacrylonitrile in a desirable molecular weight range. Therefore, a number of devices have been tried and attempts have been made to obtain polyacrylonitrile having a molecular weight in the suitable range.

It is also well known that acrylonitrile is polymerized by ionizing radiation to give polyacrylonitrile. However, most of the studies made up to now pertain to radiation polymerization of acrylonitrile in the liquid phase. Recently, it has been established that acrylonitrile is polymerized by an ionizing radiation even in the solid phase at a temperature lower than its melting point, and the thus obtained polyacrylonitrile exhibits physical properties different in various respects from those of the polyacrylonitrile polymerized in the liquid phase.

But the polyacrylonitrile polymerized in the solid state at lower temperatures by means of an ionizing radiation has the disadvantage that its molecular weight is generally far in excess of the range considered most suitable for producing shaped industrial products.

The molecular weight of polyacrylonitrile produced by low temperature solid phase radiation polymerization varies considerably depending upon the polymerization temperature. In the temperature range from just below the melting point of acrylonitrile (about −83° C.) to −140° C., the molecular weight of the produced polyacrylonitrile is remarkably high, and the viscosity ($\eta_{sp}$/C) measured in dimethylformamide is usually more than 3.1, and this value is reached in a very early stage of polymerization.

When low temperature radiation polymerization of solid phase acrylonitrile is carried out at −196° C., the maximum yield is 5–7%. In contrast, when carried out in the temperature range of from just below the melting point to −140° C., there is no such maximum limit; the yield increases along with time. In the light of these facts, research was carried out to find some means of regulating polymerization to obtain the optimum molecular weight range, from the view point of the shapability of the polymer.

The above-mentioned problems have been solved by this invention, which comprises a process for a solid phase polymerization of acrylonitrile, wherein at least one organic carbonyl compound is added to acrylonitrile as the regulator of polymerization by means of an ionizing radiation below the melting point of acrylonitrile.

SUMMARY OF THE INVENTION

The object of this invention is to produce polyacrylonitrile of suitable molecular weight range at high yield by using a polymerization-regulating agent. Another object of this invention is to produce polyacrylonitrile in the suitable molecular weight range, the physical properties such as crystallinity, tensile strength and hardness of which make it suitable for practical use. Other objects will be apparent from the description given hereinafter.

The inventors carried out research on polymerization regulators and found that organic carbonyl compounds are generally effective as a polymerization regulator to accomplish the above-mentioned objects. There may be studies on liquid phase polymerization of acrylonitrile in which acetone and the like are used as the reaction medium, but the use of such carbonyl compounds is quite different from this invention in object, construction, technique and effect.

In practising the process of this invention, it is convenient, as seen from the working examples described hereinafter, to mix and dissolve a predetermined amount of the above-mentioned organic carbonyl compound (hereinafter referred to simply as "regulator") in acrylonitrile, cool the mixture to solidify it and then irradiate it at a predetermined temperature.

The amount of the regulator to be used is determined by the species of regulator employed, polymerization temperature, kind and dose rate of the employed radiation, polymerization period and desired molecular weight, but it is generally in the range of 0.1–10 mol percent (on the basis of the amount of acrylonitrile). The use of an amount more than this range is possible, but will result in a decrease in yield.

The mechanism by which an organic carbonyl compound contributes to regulation of the molecular weight of the polymer and improvement of its physical properties in the process of this invention is thought to be as follows. Acrylonitrile which coexists with an organic carbonyl compound at a temperature lower than the melting point of acrylonitrile, in contrast with the solid crystalline state of acrylonitrile without a carbonyl compound at the same temperature, is considered to have the following characteristics: (a) the state of crystal of the former is different from that of the latter, since the former may exist in the state of solid solution or in the state of a eutectic mixture thereof, and (b) the form of crystal of the former is different from that of the latter owing to the same reason as above, or (c) the former may be in an amorphous state, and (d) electron affinity and proton affinity of the carbonyl compound may play a role in the polymerization reaction. These factors, separately or in combination, may influence the polymerization of acrylonitrile. It is understood that the above-mentioned influences (a) through (d) and their combination may vary depending upon the species, amount, state of dispersion thereof, and polymerization temperature and thus the molecular weight and physical properties of the produced polymer are varied. Even in cases where the species and amount of the used carbonyl compound and polymerization temperature are not the same, including the case where no regulator is used, polymers of the same molecular weight range may be produced. And yet in these cases, physical properties other than the molecular weight are varied. Therefore, each of the above-mentioned influence factors of the regulator has its own effect.

There is no particular limitation on the carbonyl compounds to be used as the regulator in this invention. Carbonyl compounds in general have the effect of lowering the molecular weight of the polyacrylonitrile produced. For instance, aldehydes such as formaldehyde, acetaldehyde, and benzaldehyde; ketones such as acetone, methyl ethyl ketone, and benzophenone; aliphatic and aromatic carboxylic acid esters; carboxylic acid amides such as dimethyl formamide; carboxylic acid halide; carboxylic acids such as acetic acid have this effect. The most suitable regulator should be selected by considering the reaction conditions to be employed, and the molecular weight range desired.

The radiation to be employed is gamma radiation, beta radiation or an electron beam, and mixed radiation in a nuclear reactor can be utilized. It is known that these ionizing radiations act by the same mechanism. And it is preferable to use a radiation at a dose rate of $1 \times 10^3$ r./hr. or more

DESCRIPTION OF THE PREFERRED EMBODIMENTS

Now the invention will be specifically explained by way of working examples. These examples are only for illustration of preferred embodiments of this invention, and the invention is by no means restricted thereto. In all the examples, the molecular weight of the polymer is represented by its viscosity ($\eta$ sp/C), which is determined with an 0.1% solution of the polymer in dimethylformamide (DMF) at 30° C.

Example 1

Eight (8) cc. of acrylonitrile was dried with calcium hydride and purified by fractional distillation, then put in glass ampoules, and acetophenone was added thereto in the amounts shown in Table 1. The ampoules were sealed and immersed in liquefied nitrogen for 30 minutes, then transferred to a bath held at −98° C. and kept therein for about 1 hour.

The samples were irradiated with gamma radiation from cobalt 60 at −98° C. After being irradiated for 2.5 hours at the dose rate of $1 \times 10^6$ r./hr., the contents of the ampoules were poured into methanol kept at −78° C. The produced insoluble polyacrylonitrile was separated, washed with methanol and dried at 40° C. The results are shown in Table 1.

TABLE 1

NOTE:
Regulator=Acetophenone.
Polymerization temperature=−98° C.
Dose rate=1×10⁶ r./hr.
Radiation period=2.5 hours.

| Sample number | CH₃COC₆H₅/ acrylonitrile (mole percent) | Yield of polymer (percent) | $\eta$ sp./C in DMF (0.1% 30° C.) |
|---|---|---|---|
| 1 | 0.0 | 15.2 | 3.12 |
| 2 | 0.5 | 16.1 | 3.10 |
| 3 | 1.0 | 14.5 | 3.05 |
| 4 | 2.5 | 13.5 | 3.00 |
| 5 | 5.0 | 10.1 | 2.80 |
| 6 | 10.0 | 8.3 | 2.16 |

Example 2

The procedure described in Example 1 was repeated using benzoyl chloride instead of acetophenone. The results are shown in Table 2. In this case, all the polymers obtained were somewhat colored.

TABLE 2

| Sample number | C₆H₅COCl/ acrylonitrile (mole percent) | Yield of polymer (percent) | $\eta$ sp./C in DMF (0.1% 30° C.) |
|---|---|---|---|
| 1 | 0.0 | 15.2 | 3.12 |
| 2 | 0.5 | 11.3 | 2.60 |
| 3 | 1.0 | 9.4 | 2.15 |
| 4 | 2.5 | 10.8 | 2.50 |
| 5 | 5.0 | 5.7 | 0.63 |

Example 3

The procedure described in Example 1 was repeated using benzaldehyde instead of acetophenone. The results are shown in Table 3.

TABLE 3

| Sample number | C₆H₅CHO/ acrylonitrile (mole percent) | Yield of polymer (percent) | $\eta$ sp./C in DMF (0.1% 30° C.) |
|---|---|---|---|
| 1 | 0.0 | 15.2 | 3.12 |
| 2 | 0.5 | 11.8 | 2.70 |
| 3 | 1.0 | 10.0 | 2.50 |
| 4 | 2.5 | 9.6 | 2.30 |
| 5 | 5.0 | 6.7 | 2.16 |
| 6 | 10.0 | 7.8 | 2.01 |

Example 4

The procedure described in Example 1 was repeated using methyl ethyl ketone (MEK) instead of acetophenone. The results are shown in Table 4.

TABLE 4

| Sample No. | MEK/ acrylonitrile (mole percent) | Yield of polymer (percent) | $\eta$ sp./C in DMF (0.1% 30° C.) |
|---|---|---|---|
| 1 | 0.0 | 15.2 | 3.12 |
| 2 | 0.5 | 14.6 | 3.05 |
| 3 | 1.0 | 14.7 | 2.95 |
| 4 | 2.5 | 12.0 | 2.75 |
| 5 | 5.0 | 9.3 | 2.40 |
| 6 | 10.0 | 8.6 | 2.05 |

Example 5

The procedure described in Example 1 was repeated using acetamide instead of acetophenone. The results are shown in Table 5.

TABLE 5

| Sample No. | CH₃CONH₂/ acrylonitrile (mole percent) | Yield of polymer (percent) | $\eta$ sp./C in DMF (0.1% 30° C.) |
|---|---|---|---|
| 1 | 0.0 | 15.2 | 3.12 |
| 2 | 0.5 | 10.9 | 2.85 |
| 3 | 1.0 | 11.1 | 2.70 |
| 4 | 2.5 | 9.4 | 2.55 |
| 5 | 5.0 | 9.4 | 2.60 |
| 6 | 10.0 | 10.7 | 2.80 |

Example 6

Eight (8) cc. of acrylonitrile, which had been dried over calcium hydride and purified by fractional distillation was put in glass ampoules, and acetone was added thereto in the amount shown in Table 6. The ampoules were sealed and immersed in liquefied nitrogen for 30 minutes, then transferred to a bath kept at −98° C. (melting point of methanol) and kept therein for about 1 hour.

The samples (ampoules) were irradiated with gamma radiation from cobalt 60 at −98° C. After being irradiated for 2.5 hours at the dose rate of $1 \times 10^6$ r./hr., the contents of the ampoules were poured into methanol kept at −78° C. The produced insoluble polyacrylonitrile was separated, washed with methanol and dried in vacuum at 40° C. The results are shown in Table 6.

TABLE 6

| Sample No. | Acetone/ acrylonitrile (mole percent) | Polymerization temp. (° C.) | Dose (×10⁶ r.) | Yield of polymer (percent) | η sp./C |
|---|---|---|---|---|---|
| 1 | 0.0 | −98 | 2.5 | 15.2 | 3.12 |
| 2 | 0.5 | −98 | 2.5 | 12.7 | 3.05 |
| 3 | 1.0 | −98 | 2.5 | 10.52 | 2.40 |
| 4 | 2.5 | −98 | 2.5 | 7.74 | 2.28 |
| 5 | 5.0 | −98 | 2.5 | 5.41 | 1.64 |
| 6 | 10.0 | −98 | 2.5 | 4.80 | 1.55 |

Example 7

In the same way as in Example 6 polymerization was carried out. However, acetic acid was used instead of acetone, and polymerization temperature was kept at −89° C. this time. The results are shown in Table 7.

TABLE 7

| Sample No. | Acetic acid/ acrylonitrile (mole percent) | Polymerization temp. (° C.) | Dose (×10⁶ r.) | Yield of Polymer (percent) | η sp./C |
|---|---|---|---|---|---|
| 1 | 0.0 | −89 | 2.5 | 12.8 | 2.85 |
| 2 | 0.5 | −89 | 2.5 | 12.95 | 2.97 |
| 3 | 1.0 | −89 | 2.5 | 11.4 | 2.62 |
| 4 | 2.5 | −89 | 2.5 | 9.5 | 2.12 |
| 5 | 5.0 | −89 | 2.5 | 8.15 | 1.78 |
| 6 | 10.0 | −89 | 2.5 | 5.74 | 1.33 |

Example 8

Polymerization was carried out in the same way as in Example 6 except that dimethyl formamide was used instead of acetone, and the polymerization temperature was kept at −130° C. The results are shown in Table 8.

TABLE 8

| Sample No. | DMF/ acrylonitrile (mole percent) | Polymerization temp. (° C.) | Dose (×10⁶ r.) | Yield of polymer (percent) | η sp./C |
|---|---|---|---|---|---|
| 1 | 0.0 | −130 | 2.5 | 10.0 | 2.95 |
| 2 | 0.5 | −130 | 2.5 | 11.4 | 2.57 |
| 3 | 1.0 | −130 | 2.5 | 6.66 | 2.14 |
| 4 | 2.5 | −130 | 2.5 | 6.45 | 1.55 |
| 5 | 5.0 | −130 | 2.5 | 5.96 | 1.44 |
| 6 | 10.0 | −130 | 2.5 | 5.72 | 1.58 |

Example 9

Polymerization was carried out in accordance with the procedure of Example 6, using dimethyl foramide instead of acetone; the amount of dimethyl foramide was fixed at 2.5 mole percent against acrylonitrile, and the polymerization temperature was varied. The results are shown in Table 9.

TABLE 9

| Sample No. | Polymerization temp. (° C.) | Dose (×10⁶ r.) | Yield of polymer (percent) | η sp./C | η sp./C of control [1] |
|---|---|---|---|---|---|
| 1 | −69 | 2 | 6.45 | 1.89 | 2.85 |
| 2 | −98 | 2 | 7.07 | 1.93 | 3.12 |
| 3 | −109 | 2 | 6.71 | 1.70 | 3.04 |
| 4 | −130 | 2 | 6.45 | 1.55 | 2.95 |
| 5 | −196 | 2 | 5.22 | 1.48 | 1.80 |

[1] No regulator used.

It is of course possible to carry out solid phase polymerization of acrylonitrile using two or more species of regulator selected from organic carbonyl compounds because of the mechanism by which said carbonyl compound influences said polymerization as described in this specification. By using two or more species of the regulators, polyacrylonitriles with varied molecular weight and other properties can be manufactured, since the state and form of crystallization of the solid phase acrylonitrile are varied and electron affinity and proton affinity of said regulator can be varied.

What is claimed is:

1. In the process of solid phase polymerization of acrylonitrile at a temperature below the melting point of acrylonitrile by means of a high energy ionizing radiation with a total dose sufficient and effective to produce said polymerization, the improvement of adding to the acrylonitrile, before the polymerization thereof, about 0.1 to 10 mol percent, based on the acrylonitrile, of at least one organic carbonyl compound capable of lowering the molecular weight of the polyacrylonitrile resulting from the solid phase polymerization, the compound being selected from aldehydes, ketones, organic esters of carboxylic acids, carboxylic acid amides, carboxylic acid halides and carboxylic acids.

2. A process as set forth in claim 1, in which the polymerization is carried out at a temperature between the melting point of acryonitrile and −196° C.

3. A process as set forth in claim 1, in which the organic carbonyl compound is dissolved in the acrylonitrile, the mixture is solidified by cooling and then is irradiated by means of the ionizing radiation.

4. A process as set forth in claim 1, in which the organic carbonyl compound is selected from acetophenone, benzoyl chloride, benzaldehyde, methyl ethyl ketone, acetoamide, acetone, acetic acid and dimethyl formamide.

5. A process as set forth in claim 1, in which a dose rate of at least about $10^3$ r./hr. of the high energy ionizing radiation is used.

6. A process as set forth in claim 5, in which the dose is $10^6$ r. for 2.5 hours.

References Cited

UNITED STATES PATENTS 3,475,306 10/1969 Clocker _____ 204—159.23

OTHER REFERENCES

Chapiro: Chem. Abstracts, vol. 58, pp. 6932–6933 (1963).

Baskalou et al.: Chem. Abstracts, vol. 58, p. 6933 (1963).

Hunyar et al.: Chem. Abstracts, vol. 60, p. 1859 (1965).

Baikova et al.: Chem. Abstracts, vol. 64, p. 14,286 (1966).

Schildknecht: Vinyl and Related Polymers, Wiley & Sons, New York, 1956, pp. 15, 26.

SAMUEL H. BLECH, Primary Examiner

R. B. TURER, Assistant Examiner

U.S. Cl. X.R.

204—159.22